United States Patent
Lee et al.

(10) Patent No.: US 7,927,002 B2
(45) Date of Patent: Apr. 19, 2011

(54) BACKLIGHT UNIT AND LIQUID CRYSTAL DISPLAY DEVICE COMPRISING THE SAME

(75) Inventors: Cheol Hun Lee, Yongin-si (KR); Dong Lyoul Shin, Suwon-si (KR); Hyo Suck Chun, Suwon-si (KR); Yong Seok Kwak, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 167 days.

(21) Appl. No.: 12/332,404

(22) Filed: Dec. 11, 2008

(65) Prior Publication Data

US 2009/0097272 A1    Apr. 16, 2009

Related U.S. Application Data

(63) Continuation of application No. 11/682,384, filed on Mar. 6, 2007, now Pat. No. 7,478,939.

(30) Foreign Application Priority Data

May 3, 2006    (KR) .................. 10-2006-0040038

(51) Int. Cl.
*F21V 7/04* (2006.01)
(52) U.S. Cl. .................. 362/620; 362/612; 362/621

(58) Field of Classification Search .................. 362/615, 362/617, 619, 625, 612, 613, 330; 349/62, 349/63
See application file for complete search history.

(56) References Cited

U.S. PATENT DOCUMENTS

| | | | |
|---|---|---|---|
| 6,624,937 B2 * | 9/2003 | Kashima ................ | 359/495 |
| 7,168,841 B2 * | 1/2007 | Hsieh et al. .............. | 362/613 |
| 7,217,025 B2 | 5/2007 | Kim et al. | |
| 2004/0184257 A1 * | 9/2004 | Huang ..................... | 362/31 |
| 2005/0117370 A1 | 6/2005 | Kawashima et al. | |
| 2006/0050200 A1 | 3/2006 | Nagao | |
| 2006/0083028 A1 * | 4/2006 | Sun et al. ................. | 362/615 |

* cited by examiner

*Primary Examiner* — Ali Alavi
(74) *Attorney, Agent, or Firm* — Cantor Colburn LLP

(57) ABSTRACT

A backlight unit capable of reducing or effectively preventing a hot spot phenomenon includes a plurality of light sources generating lights, a light guide plate including a portion on which the lights generated from the light sources are incident and converting the lights incident on the portion into a surface-shaped lights and a light path converter converting a traveling direction of the lights incident on the portion of the light guide plate in an area where the lights emitted from the light sources diodes overlap each other.

12 Claims, 10 Drawing Sheets

BACKLIGHT UNIT AND LIQUID CRYSTAL DISPLAY DEVICE COMPRISING THE SAME

This application is a continuation application of U.S. Application No. 11/682,384 filed Mar. 6, 2007, which claims priority to and the benefit of Korean Patent Application No. 2006-0040038 filed on May 3, 2006, and all the benefits accruing therefrom under 35 U.S.C. §119, the contents of which are herein incorporated by reference in their entirety.

BACKGROUND OF THE INVENTION

1. Field of the Invention

The present invention relates to backlight units, and more particularly, to a backlight unit for improving light efficiency, and a liquid crystal display device including the backlight unit.

2. Description of the Related Art

A liquid crystal display ("LCD") device has gradually extended its application range due to light weight, thin thickness, and low consumption power driving. The LCD device applies an electric field to liquid crystal materials with dielectric anisotropy, injected between two substrates, and controls the amount of light transmitted into the substrates by adjusting the intensity of the electric field, thereby displaying a desired image.

Since an LCD panel of the LCD device is a non-luminous element that cannot emit light by itself, the LCD device includes a backlight unit for providing light to the LCD panel.

A light emitting diode ("LED") used for the backlight unit has long life span, fast lighting speed, low power consumption and high impact resistance, compared to a cold cathode fluorescent lamp ("CCFL"), etc. Moreover, the LED is suitable to make the backlight unit relatively small and thin.

Such LEDs are mounted on a light source substrate supplying driving voltage to the LEDs. The light source substrate may be bonded to a light guide plate for guiding an incident light from the LEDs toward an LCD panel. FIG. 1 is a plan view illustrating a light guide plate and LEDs of a conventional LCD device of the prior art. Maximum light efficiency can be obtained when emitting surfaces of LEDs 16 are in contact with an incident surface of a light guide plate 24 as illustrated in FIG. 1. However, lights emitted from the LEDs 16 overlap each other in areas "A" where a portion of the light guide plate 24 does not overlap the LEDs 16. A "hot spot" phenomenon occurs in that the areas "A", where the light emitted from the LEDs 16 overlap each other, include a greater amount of emitting lights than the other areas and thus seem to be relatively bright.

BRIEF SUMMARY OF THE INVENTION

An exemplary embodiment provides a backlight unit capable of reducing or effectively preventing a hot spot phenomenon and an LCD device including the backlight unit.

In an exemplary embodiment there is provided a backlight unit including a plurality of light sources generating lights, a light guide plate including a light incident surface on which the lights generated from the light sources are incident and converting line-shaped lights incident on the portion into a surface-shaped light and a light path converter converting a traveling direction of the lights traveling a portion of the light guide plate in an area where the lights emitted from the light sources overlap each other.

In an exemplary embodiment there is provided an LCD device including an LCD panel displaying images and a backlight unit supplying lights to the LCD panel. The backlight unit includes a plurality of light sources generating the lights, a light guide plate including a light incident surface on which the lights generated from the light sources are incident and converting the lights incident on the incident surface into a surface-shaped light and a light path converter converting a traveling direction of the lights traveling a portion of the light guide plate in an area where the lights emitted from the light sources overlap each other.

In an exemplary embodiment, the light path converter includes a plurality of dispersion grooves formed from an upper surface and a lower surface of the portion of the light guide plate.

In an exemplary embodiment, the dispersion grooves are formed along the traveling direction of the lights and the number of the dispersion grooves is increased as the dispersion grooves are spaced further away from the light sources.

In an exemplary embodiment, the dispersion grooves form a fan shape of which a width of the fan shape is increased as the dispersion grooves are spaced farther away from the light sources.

In an exemplary embodiment, the dispersion grooves are formed in a hemispheric, semi-circular, or semi-polygonal shape.

In an exemplary embodiment, the light path converter includes a plurality of first dispersion grooves formed at an upper surface of the portion of the light guide plate and a plurality of second dispersion grooves formed at a lower surface of the portion of the light guide plate.

In an exemplary embodiment, the first and second dispersion grooves face each other.

In an exemplary embodiment, the first dispersion grooves are formed between the second dispersion grooves.

In an exemplary embodiment, the light path converter disperses the incident lights.

In an exemplary embodiment, the backlight unit further includes a light scattering part disposed in the dispersion grooves and including a scattering material.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Figure 1:
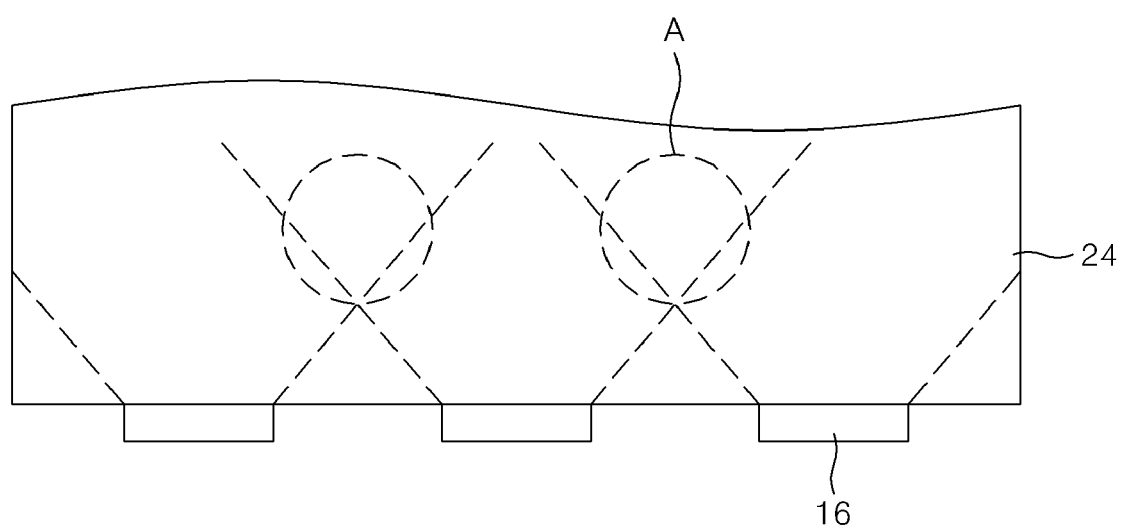
FIG. 1 is a plan view illustrating a light guide plate and LEDs of a conventional LCD device of the prior art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" other elements or features would then be oriented "upper" or "above" the other elements or features. Thus, the exemplary term "under" can encompass both an orientation of above and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The exemplary embodiments of the present invention will now be described with reference to the attached drawings.

Figure 2:
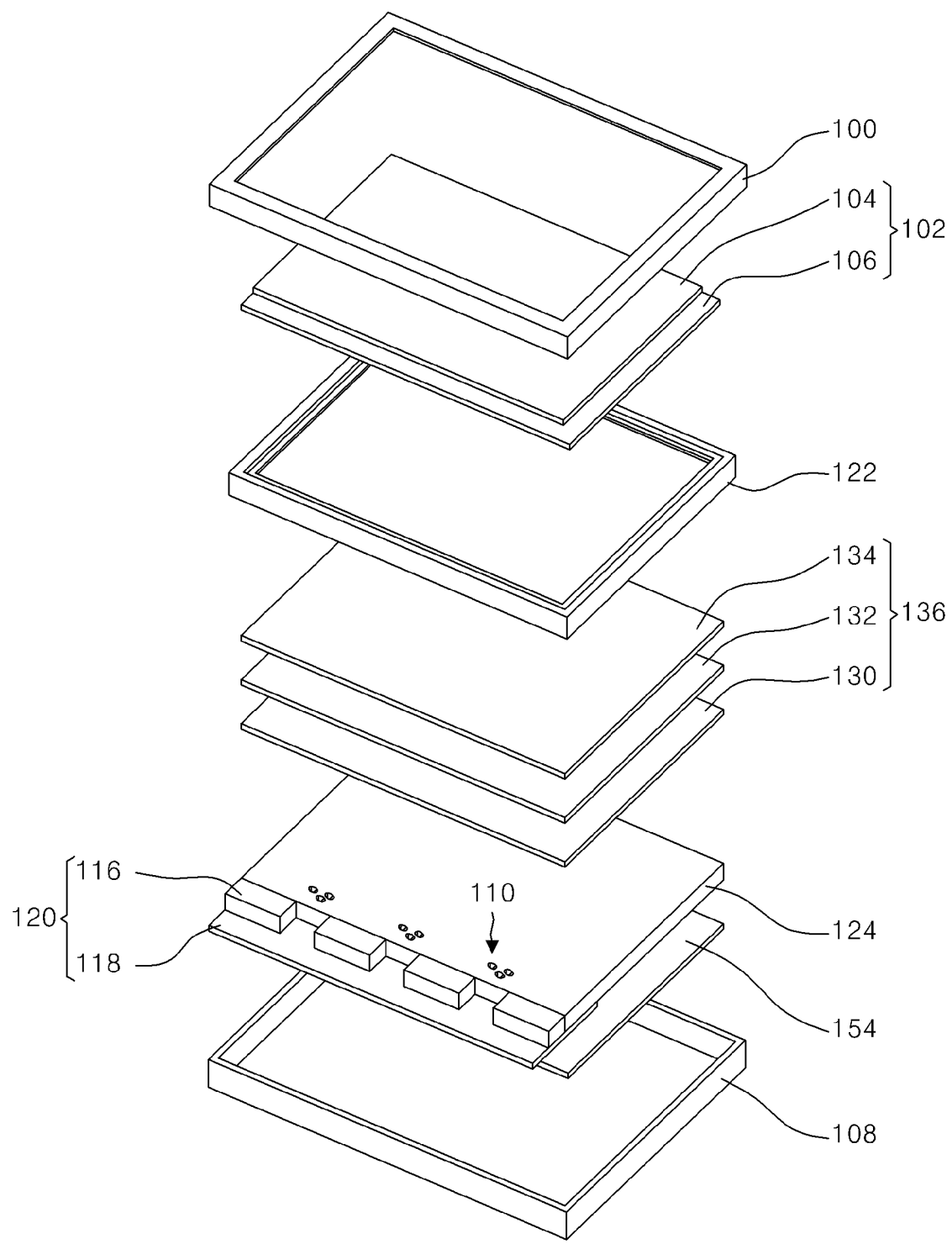
FIG. 2 is a perspective view illustrating an exemplary embodiment of an LCD device according to the present invention.

FIG. 2 is a perspective view illustrating an exemplary embodiment of an LCD device according to the present invention.

Referring to FIG. 2, the LCD device includes an LCD panel 102, a backlight unit supplying light to the LCD panel 102, a mold frame 122 in which the LCD panel 102 is positioned, a top chassis 100 encompassing edges of the LCD panel 102 and the mold frame 122, and a bottom chassis 108 containing or receiving the backlight unit and its adjacent region therein.

The LCD panel 102 includes a first substrate 106, such as a thin film transistor ("TFT") substrate and a second substrate 104, such as a color filter substrate that face each other. A sealant (not shown) is disposed between the TFT substrate 106 and the color filter substrate 104, essentially bonding the two substrates together. Liquid crystals (not shown) are disposed between the TFT substrate 106 and the color filter substrate 104.

The color filter substrate 104 may include a structure in which a color filter array, including black matrixes reducing or effectively preventing light leakage, color filters representing colors, a common electrode forming an electric field perpendicular with a pixel electrode, and an upper alignment layer coated for the alignment of the liquid crystals on those elements, are formed on an upper substrate.

The TFT substrate 106 may include a structure in which a TFT array, including gate and data lines formed to cross each other, TFTs formed at intersections of the gate and data lines, pixel electrodes connected to the TFTs, and a lower alignment layer coated for the alignment of the liquid crystals on those elements, are formed on a lower substrate.

The mold frame 122 may include inner sidewalls of a stepped projection surface. The backlight unit is mounted on the inner lowermost portion or step of the mold frame 122, the LCD panel 102 is mounted in the mold frame 122 and optical sheets 136 are mounted between the backlight unit and the LCD panel 102 such that the LCD panel 102 is located on the optical sheets 136.

The upper chassis 100 is formed substantially in a rectangular band (or frame) shape having plane (e.g. bottom surface) and side surface that meet perpendicularly each other. The upper chassis 100 encompasses edges of the backlight unit and the LCD panel 102 and the mold frame 122. The upper chassis 100 protects the LCD panel 102 and the backlight unit from an external shock and reduces or effectively prevents a departure of elements between the upper chassis 100 and the bottom chassis 108 from each other.

The bottom chassis 108 supports a light source substrate 118 and LEDs 116 mounted on the light source substrate 118 and emits heat generated and reflected by the light source substrate 118 and a reflection sheet 154.

The backlight unit includes a light generator 120, a light guide plate 124 to which light is supplied from the light generator 120, a plurality of optical sheets 136 mounted sequentially on the light guide plate 124 and the reflection sheet 154 installed under the light guide plate 124. As illustrated in FIG. 2, the light source substrate 118 may not extend an entire distance of the light guide plate 124 in a transverse direction of the light guide plate 124. In alternative exemplary embodiments, the light source substrate 118 may extend substantially all of a width of the light guide plate 124 in the transverse direction.

The optical sheets 136 cause light emitted from the light guide plate 124 to be incident into the LCD panel 102. The optical sheets 136 diffuse the light emitted from the light guide plate 124 and enhance luminance of the display device. In exemplary embodiments, the optical sheets 136 may include a diffusion sheet 130, a prism sheet 132 and/or a protection sheet 134.

The diffusion sheet 130 causes incident light from the light guide plate 124 to be directed to the front of the LCD panel 102. Also, the diffusion sheet 130 diffuses the light from the light guide plate to have uniform distribution over a wide range such that the light can be irradiated to the LCD panel 102. In exemplary embodiments, the diffusion sheet 130 may include a film of a transparent resin of which both surfaces are coated with an optical diffusion member. The prism sheet 132 converts a traveling angle of light diffused by the diffusion sheet 130 into an angle substantially perpendicular to the LCD panel 102. The efficiency of light is increased when the light incident into the LCD panel 102 is at right angles with the LCD panel 102 when the prism sheet 132 is employed. The protection sheet 134 protects the surface of the prism sheet 132 and diffuses light passing through the prism sheet 132.

The reflection sheet 154 reflects the light incident on itself through a rear surface of the light guide plate 124 toward the light guide plate 124. In exemplary embodiments, the reflection sheet 154 may include a plate having high light reflectivity, thereby reducing the loss of light.

The light generator 120 includes the LEDs 116 and the light source substrate 118 on which the LEDs 116 are mounted.

The LEDs 116 are mounted on the light source substrate 118 and generate light. The LEDs 116 may be bonded to the light guide plate 124 by any of a number of methods suitable for the purpose described herein. Light generated from the LEDs 116 are incident on the light guide plate 124 through an incident surface formed at one side of the light guide plate 124 corresponding to the LEDs 116.

In exemplary embodiments, the light source substrate 118 is formed of a flexible printed circuit ("FPC") or a printed circuit board ("PCB"). In one exemplary embodiment, at least two LEDs 116 are mounted on the light source substrate 118 such as illustrated in FIG. 2. The light source substrate 118 emits heat irradiated from the LEDs 116 to the exterior and supplies a driving voltage to the LEDs 116. In an alternative exemplary embodiment, more or less that two light sources 116, such as LEDs, may be mounted to the light source substrate 118.

The light guide plate 124 converts a relatively line-shaped light emitted from the LEDs 116 into a relatively surface-shaped light and guides the surface light source toward the LCD panel 102. The light traveling toward the rear surface of the light guide plate 124 is reflected by the reflection sheet 154 and travels toward the light guide plate 124.

Figure 3:
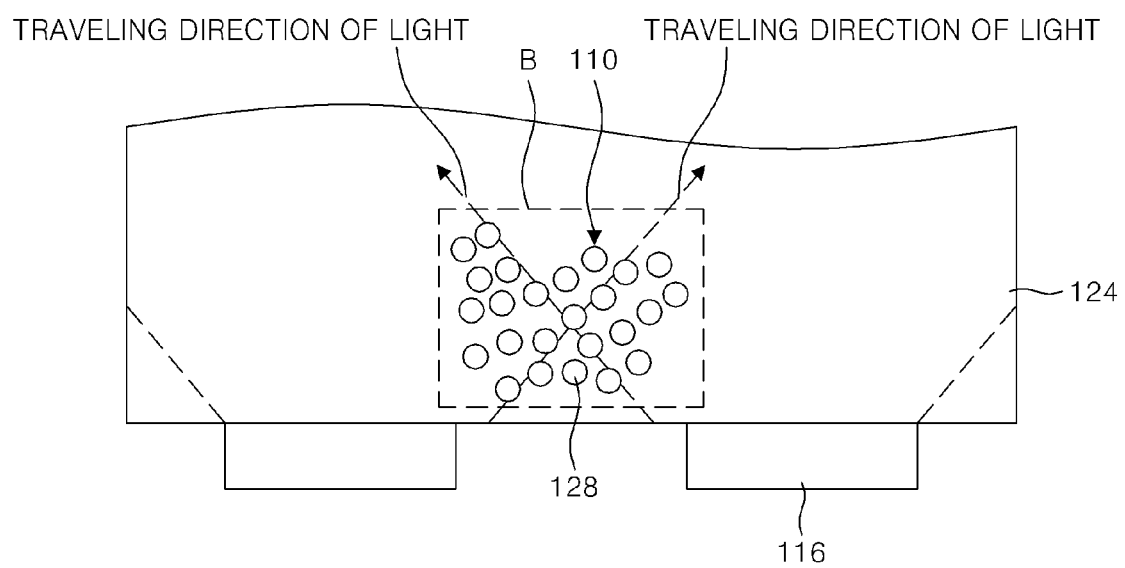
FIG. 3 is a plan view illustrating an exemplary embodiment of a light incident portion of the light guide plate and the LEDs illustrated in FIG. 2.

A light path converter 110 may be formed in the light guide plate 124 as illustrated in FIG. 3 in an area where a portion of the light guide plate 124 does not overlap the LEDs 116 (or that is between adjacent LEDs 116 in a longitudinal direction of the light guide plate 124) The portion of the light guide plate 124 that does not overlap the LEDs 116 is indicated in an area "B" where lights emitted from the LEDs overlap each other.

Figure 4:
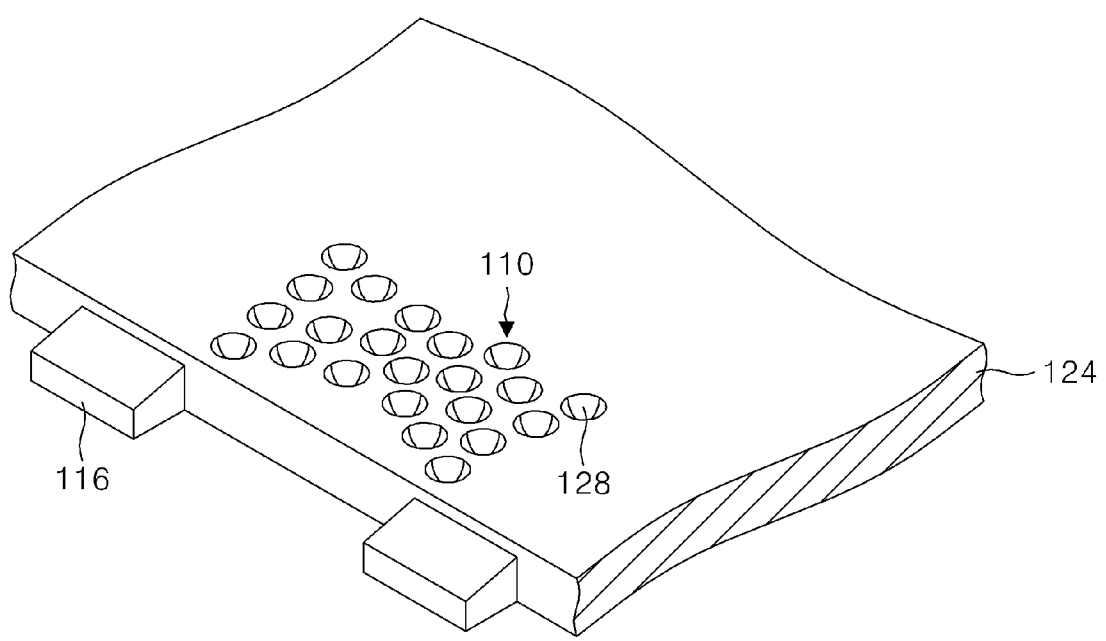
FIG. 4 is a perspective view illustrating an exemplary embodiment of dispersion grooves of the light path converter illustrated in FIG. 3.

In an exemplary embodiment, the light path converter 110 may be formed of a plurality of dispersion grooves 128. The dispersion grooves 128 may be formed in a hemispheric, semi-circular and/or polygonal shape as illustrated in FIG. 4. In exemplary embodiments, the dispersion grooves 128, such as illustrated in FIG. 4, may include a circular shape on a plane of an upper surface of the light guide plate 124. A profile or cross section of the dispersion grooves 128 taken from the upper surface to a lower surface of the light guide plate 124 may be considered to have a hemispheric, semi-circular and/or polygonal shape.

In one exemplary embodiment, each of the dispersion grooves 128 is about 1 to 2 millimeters (mm) in width (taken in a direction substantially parallel with a plane of the upper surface of the light guide plate 124) and/or depth (taken in a direction substantially perpendicular to a plane of the upper surface of the light guide plate 124).

Figure 5:
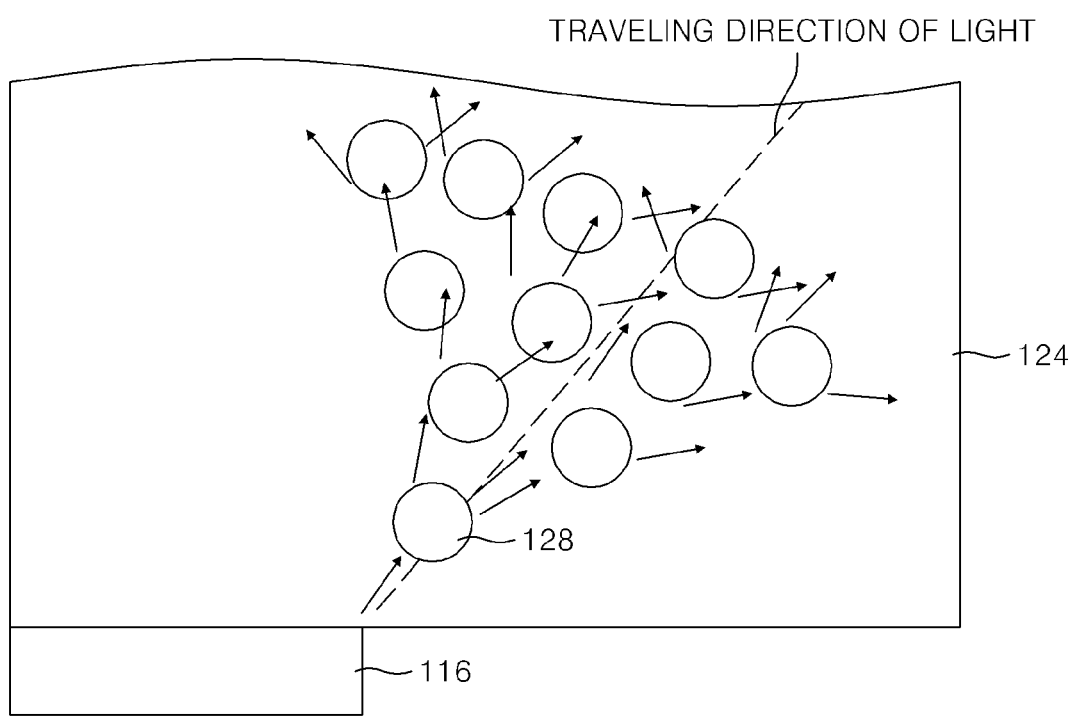
FIG. 5 is a view describing an exemplary embodiment of a traveling path of lights incident into the light path converter illustrated in FIG. 4.

As illustrated in FIG. 5, the dispersion grooves 128 are formed along a traveling direction of light (indicated by the dotted line) in an area where light emitted from the LEDs overlap each other. As the dispersion grooves 128 are spaced farther away from the LEDs 116, the number (or density) of the dispersion grooves 128 is increased. As illustrated in FIG. 5, the light path converter 110 including the plurality of dispersion grooves 128 is considered as forming a fan shape of which width of the fan is increased as the dispersion grooves 128 are spaced at a distance farther away from the LEDs 116.

Air is buried or held into the dispersion grooves 128 of the light path converter 110. Refractive indexes of the dispersion grooves 128 and the light guide plate 124 become different. Lights that are incident on the light guide plate 124 from the LEDs 116 having linearity are refracted and diffracted at a boundary between the light guide plate 124 and the dispersion grooves 128 as illustrated in FIG. 5 by the arrows around the dispersion grooves 128. In one exemplary embodiment, the dispersion grooves 128 formed in a hemispheric or semi-circular shape include a curvature having different slopes at incident points of lights. Hence, lights incident into the light path converter 110 are refracted in different directions according to the incident points of the dispersion grooves 128 having the curvature. The light path converter 110 including the dispersion grooves 128 having curvature to refract incident lights in different directions can refract lights in various directions when compared with the light path converter 110 including the dispersion grooves of a polygonal shape which may have the similar or substantially the same slope at incident points.

In the illustrated exemplary embodiments, the light path converter 110 is formed on the portion of the light guide plate 124 between the LEDs 116 and refracts lights that are incident on the light guide plate 124 and that have linearity in various directions. Advantageously, a "hot spot" phenomenon can be reduced or effectively prevented where lights are concentrated to the portion of the light guide plate 124 between the LEDs 116.

The light path converter 110 may be formed in one of any variety of shapes, such as shown in FIGS. 6A to 6D. The light path converter 110 illustrated in FIG. 6A includes a plurality of dispersion grooves 128 formed from the upper surface of the light guide plate 124 in a direction toward the lower surface of the light guide plate 124 at a given depth. The light path converter 110 illustrated in FIG. 6B includes a plurality of dispersion grooves 128 formed from the lower surface of the light guide plate 124 in a direction toward the upper surface at a given depth.

Figure 6A:
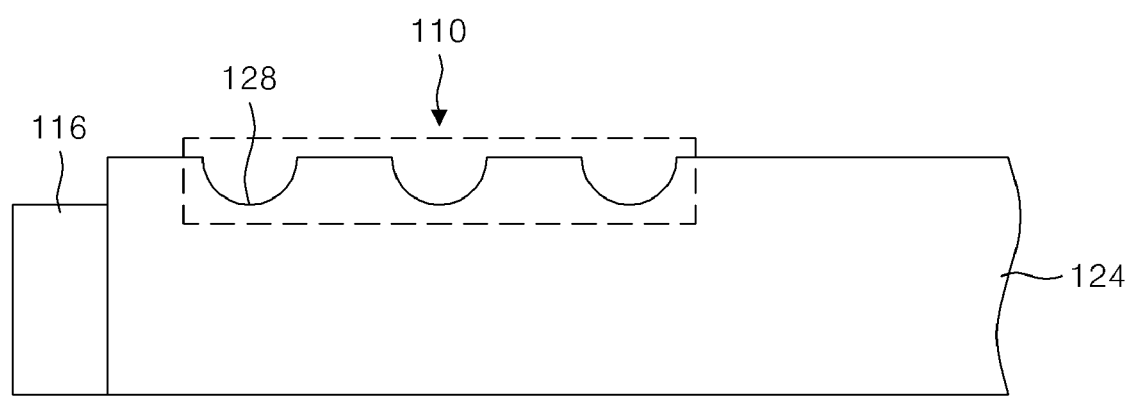
FIGS. 6A to 6D are cross-sectional views illustrating other exemplary embodiments of dispersion grooves described in FIG. 5.
Figure 6B:
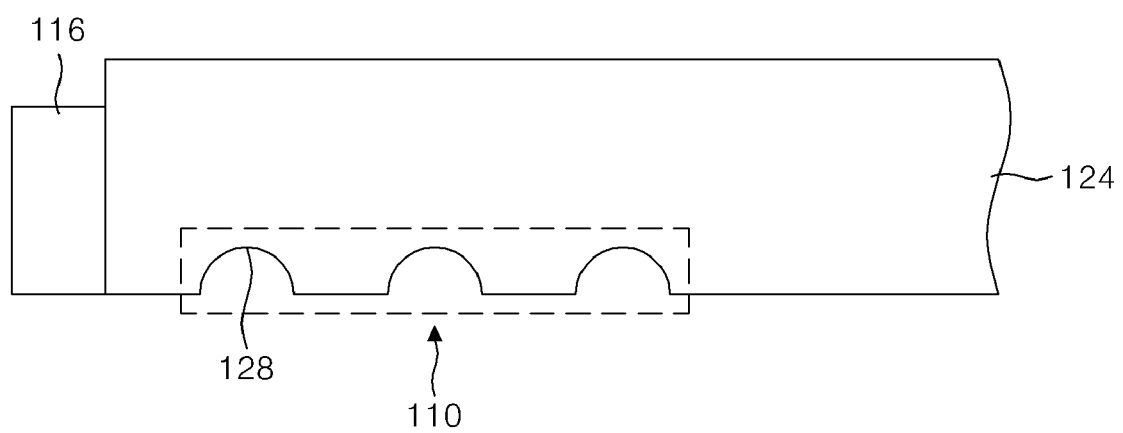
Figure 6C:
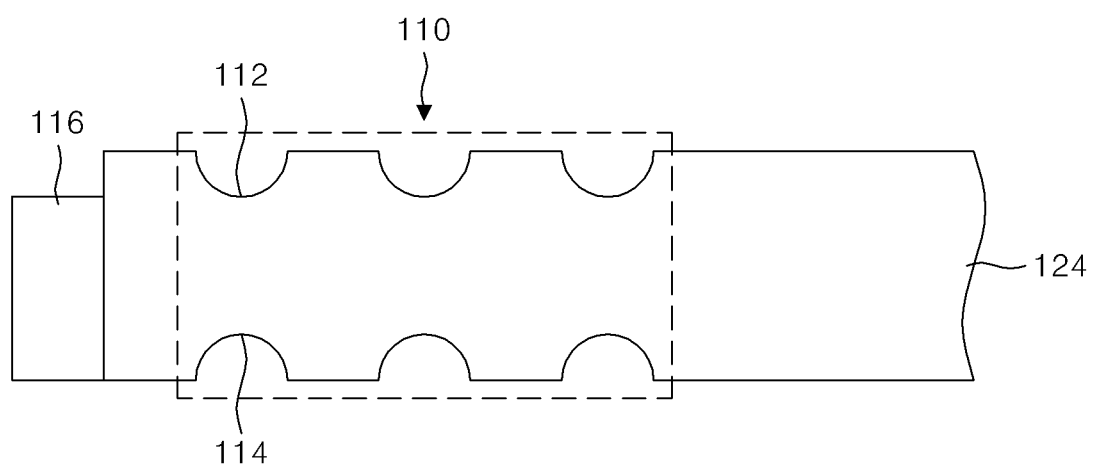
Figure 6D:
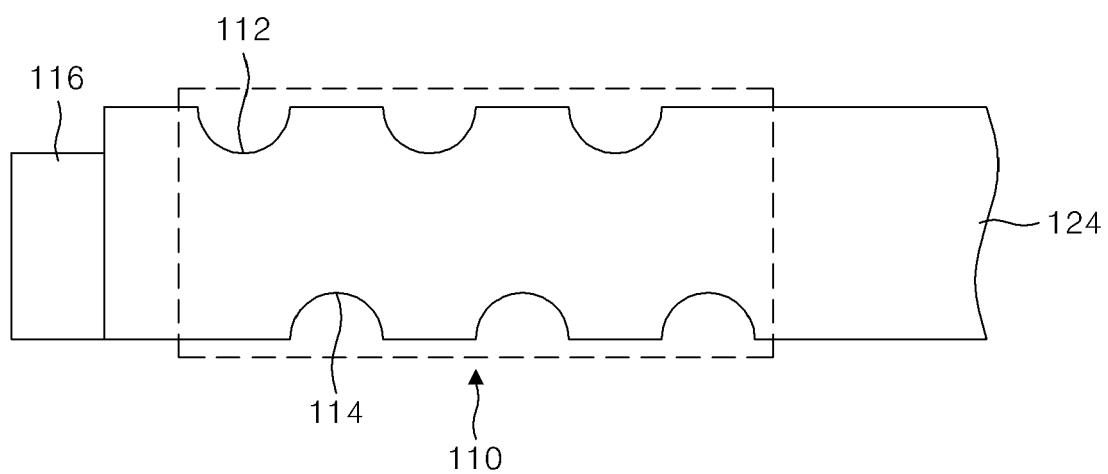

The light path converter 110 illustrated in FIG. 6C includes a plurality of first dispersion grooves 112 formed from the upper surface of the light guide plate 124 in a direction toward the lower surface of the light guide plate 124 at a given depth and a plurality of second dispersion grooves 114 facing the first dispersion grooves 112 and formed from the lower surface of the light guide plate 124 in a direction toward the upper surface at a given depth. The light path converter 110 illustrated in FIG. 6D includes a plurality of first dispersion grooves 112 formed from the upper surface of the light guide plate 124 in a direction toward the lower surface of the light guide plate 124 at a given depth and a plurality of second dispersion grooves 114 formed between or alternating with the first dispersion grooves 112 and formed from the lower surface of the light guide plate 124 in a direction toward the upper surface at a given depth. In an exemplary embodiment where the first and second dispersion grooves 112 and 114 are formed at both upper and lower surfaces of the light guide plate 124 as illustrated in FIGS. 6C and 6D, the reduction or prevention of the hot spot phenomenon may be more effective than the case when the dispersion grooves 128 are formed at one surface of the light guide plate 124 as illustrated in FIGS. 6A and 6B.

Figure 7:
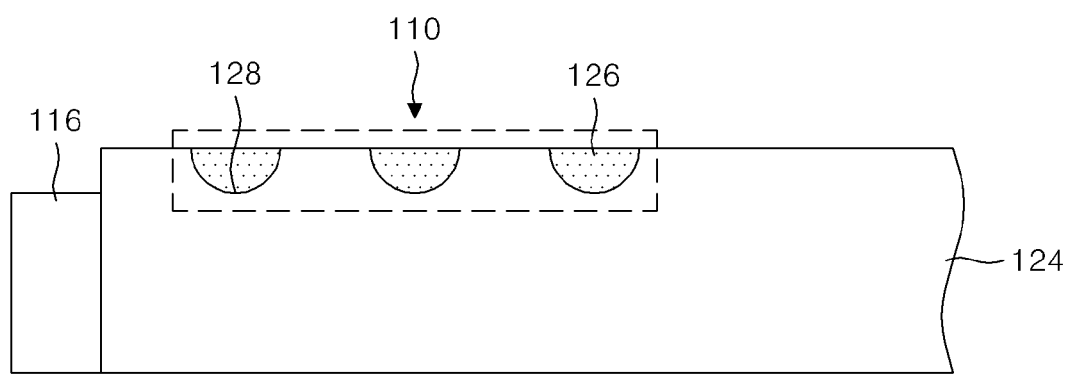
FIG. 7 is a cross-sectional view illustrating another exemplary embodiment of a light guide plate and LEDs according to the present invention.

Referring to FIG. 7, another exemplary embodiment of the backlight unit according to the present invention includes the same elements as shown in FIGS. 2 to 6 except light scattering parts buried in the dispersion grooves of the light path converter. Therefore, a detailed description of the same elements will be omitted.

Light scattering parts 126 shown in FIG. 7 are formed by burying or disposing a scattering material in the dispersion grooves 128 of the light path converter 110. The uppermost surfaces of the light scattering parts 126 are substantially in parallel with the upper surface of the light guide plate 124. The light scattering parts 126 scatter refracted light incident on the light path converter 110, thereby raising a dispersion effect of light. Advantageously, the backlight unit can reduce or effectively prevent a hot spot phenomenon that lights are concentrated to the portion of the light guide plate 124 between the LEDs 116.

As in the illustrated exemplary embodiments, the backlight unit and the LCD device including the same include the light path converter comprising a plurality of dispersion grooves in an area where lights emitted from LEDs overlap each other. Then lights having linearity incident on the light guide plate are refracted in various directions by the light path converter. Advantageously, a hot spot phenomenon that lights are concentrated to the portion of the light guide plate between the LEDs can be reduced or effectively prevented.

In an exemplary embodiment, since a plurality of dispersion grooves of the light path converter may be manufactured by an injection method, additional cost is not required.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of guiding lights using a light guide plate, the method comprising:
   receiving lights emitted from a plurality of light sources spaced apart from each other, through a light incident of the light guide plate; and
   refracting a portion of the lights using a light path converter of the light guide plate, the portion of the lights being incident into the light guide plate corresponding to spacing between the light sources,
   wherein
   the light path converter is recessed into a surface of the light guide plate adjacent to the light incident surface, and
   a portion of the light path converter adjacent to the light incident surface is disposed only between adjacent light sources in a plane view.

2. The method of claim 1, wherein the light path converter disperses the lights traveling into the light guide plate.

3. The method of claim 1, wherein the light sources are light emitting diodes.

4. The method of claim 1, wherein light path converter comprises a plurality of dispersion grooves formed from one of an upper and a lower surface of the light guide plate.

5. The method of claim 4, wherein each of the plurality of dispersion grooves is separated from each other within the light path converter.

6. The method of claim 4, wherein the dispersion grooves are formed along the traveling direction of the lights incident on the light guide plate and the number of the dispersion grooves is increased as the dispersion grooves are spaced farther away from the light sources.

7. The method of claim 6, wherein the dispersion grooves form a fan shape of which a width of the fan shape is increased as the dispersion grooves are spaced farther away from the light sources.

8. The method of claim 4, wherein the dispersion grooves are formed in a hemispheric, semi-circular, or semi-polygonal shape.

9. The method of claim 1, wherein the light path converter comprises:
   a plurality of first dispersion grooves formed at an upper surface of the portion of the light guide plate; and
   a plurality of second dispersion grooves formed at a lower surface of the portion of the light guide plate.

10. The method of claim 9, wherein the first and second dispersion grooves face each other.

11. The method of claim 9, wherein the first dispersion grooves are formed between the second dispersion grooves.

12. The method of claim 9, further comprising a light scattering part disposed in the dispersion grooves and including a scattering material.

* * * * *